Sept. 1, 1970     W. R. HESLOP ET AL     3,526,683
METHOD FOR DUAL CROSSLINKING
Filed March 22, 1968

WILLIAM R. HESLOP
NORMAN THORP
        INVENTORS.

BY *Lyon & Lyon*

ATTORNEYS

United States Patent Office 3,526,683
Patented Sept. 1, 1970

3,526,683
METHOD FOR DUAL CROSSLINKING
William R. Heslop, Atherton, and Norman Thorp, Redwood City, Calif., assignors to Raychem Corporation, Menlo Park, Calif., a corporation of California
Filed Mar. 22, 1968, Ser. No. 715,398
Int. Cl. B29c *27/20;* B29d *7/22*
U.S. Cl. 264—22                                29 Claims

ABSTRACT OF THE DISCLOSURE

This invention relates to a method for forming a heat recoverable article having different degrees of heat recoverability in different parts of the article by crosslinking a portion of the article in its heat recoverable state, thereby locking in the stresses produced in forming said heat recoverable state, and distorting the article to a new heat recoverable state. The portion of the article thus treated will then tend to recover to the dimension at which the stress locking occurred rather than the first memory dimension.

BACKGROUND OF THE INVENTION

It is known that polymers can be fabricated into materials having the property of heat recoverability. This may be accomplished by first fabricating an article in the final desired size and shape and then crosslinking it in that shape. The crosslinking can be accomplished by the use of high energy radiation or chemical crosslinking techniques or by combinations of the two. Subsequent heating of the material will melt the crystals in a crystalline thermoplastic material or significantly lessen other internal molecular forces such as hydrogen bonding or dipole-dipole interactions to an extent sufficient to allow distortion above the melt of the product. Quenching of the heated and distorted crosslinked material will result in a product which is in its distorted shape while at room temperature. Reheating of the product sufficient to melt the crystals and/or reduce other intermolecular forces will allow the crystalline material to quickly return the product to its initial crosslinked size and shape. Such heat recoverable articles are said to have elastic memory.

Certain materials such as polyvinylchloride have the property of plastic memory. Deformation at a temperature below the melt and quenching of an uncrosslinked polyvinylchloride will result in an article which also is heat recoverable.

Exemplary methods for imparting the property of heat recoverability are disclosed in U.S. Pats. Nos. 2,027,962 and 3,086,242 which are incorporated herein by reference.

In some instances, it is desirable to form an article which will show different degrees of heat recoverability in different parts of the article. Thus, a tube which is intended to shrink over and form a sleeve for a part having irregular dimensions, e.g., an insulator for a splice between wires of different size, should preferably recover to a different diameter at different points along its length so that the recovered tube shape conforms with that of the part it covers. Such differential heat recovery may be achieved by molding a tube having the desired varying final diameter and then expanding it to a uniform diameter. On the application of heat, there would be a differential recovery. Such a technique, however, has disadvantages including the necessity of using expensive molding equipment.

SUMMARY OF THE INVENTION

Briefly, the present invention comprises heat recoverable articles which have different degrees of heat recoverability in different parts of the articles. This invention also comprises the method of forming such articles wherein at least a portion of the article is converted to a second and different memory state. According to this method, a uniformly heat recoverable article is crosslinked in only a portion of the article to lock in the stresses in that part of the article thus destroying its heat recoverability and the article is then distorted to a new heat recoverable state.

It is, therefore, an object of the present invention to provide a method for converting a heat recoverable material from one memory state to a second and different memory state.

It is a further object of the present invention to provide a heat recoverable article which will recover a different amount in different sections of the article and the method for forming said article.

These and other objects will be evident from the disclosure and examples which follow, and from a more detailed description of the accompanying drawings in which.

DESCRIPTION OF THE PREFERRED EMBODIMENTS

The starting material to be used in the process of this invention is a material which has the property of heat recoverability. The property of heat recoverability is possessed by material such as polyvinylchloride and may be imparted to a polymeric material by crosslinking in any conventional manner. By way of illustration, a polymer may be first formed into its final desired shape and then crosslinked in this shape. The crosslinking may be carried out by irradiation according to techniques well understood in the art and set forth in U.S. Pat. No. 3,086,242 or it may be accomplished by chemical means. Thus, a chemical crosslinking agent may be incorporated into the polymer before it is shaped and then, after shaping, sufficient heat or other crosslinking initiation means may be supplied to the shaped polymer to cause chemical crosslinking.

After the polymer has been crosslinked in its desired final shape, it is then heated above its crystalline melting point and distorted into a new size or shape. For example, a piece of irradiated tubing might be heated above its crystalline melting point and expanded by internal pressure according to the method disclosed in U.S. Pat. No. 3,086,242. After attaining the new dimension, the polymer is held at the new dimension while it is cooled down to room temperature thus locking in stresses and causing the polymer to remain at its new shape until reheated.

It has been found that if heat recoverable material in the recoverable state is subjected to crosslinking in a sufficient amount at its distorted dimension, it may become heat recoverable with respect to this new dimension. The degree of crosslinking at the distorted dimension must be sufficient to lock in the stresses caused by the original distortion and, in the case of a crosslinked material, this requires a higher concentration of crosslinks than was introduced during the first crosslinking step. Thus, a crosslinked heat recoverable material may be further crosslinked at its expanded or distorted state so that the recoverable state is no longer the state in which is exited during the first crosslinking but rather the expanded or distorted state in which it exists during the second crosslinking. The further crosslinking locks in the stresses caused by the original distortion. Furthermore, the second heat recoverable state need not be the state to which the material was expanded after the first crosslinking, but it can be any state whatsoever to which the material may be distorted.

Figure 1:
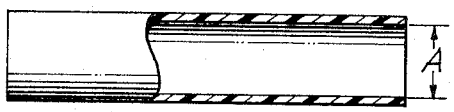
FIGS. 1–5 are illustrative diagrammatic views of one method of obtaining the articles of the present invention.
Figure 2:
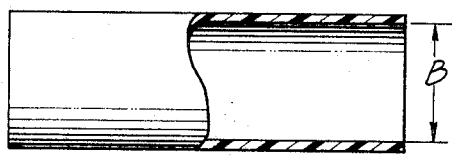

The invention can be most readily understood by reference to the drawings. FIGS. 1–5 illustrate a method of applying the process of the present invention to a heat recoverable polymeric tubing to obtain a tubing which will have a different degree of heat recovery in different parts and which can be applied to fit snuggly over an article having a varying diameter. FIG. 1 represents a side view of a piece of tubing having diameter A. This tubing may have plastic memory properties or may have had elastic memory properties imparted to it by crosslinking, e.g., by irradiation. The tubing is expanded to diameter B as shown in FIG. 2 and cooled so that on cooling the tubing will retain the diameter shown in FIG. 2. If the middle section of the tubing is then held at ambient temperature while the two end sections are heated, the tubing will heat recover at its ends to diameter A while remaining at diameter B near its central section, and will thus assume a shape illustrated in FIG. 3.

The differential application of heat can be accomplished by any desired method. For example, a heat absorbing shield may be placed to cover those portions of the tube which are not to be recovered. Alternatively, the heating may be limited to the areas where heat recovery is desired.

Figure 3:
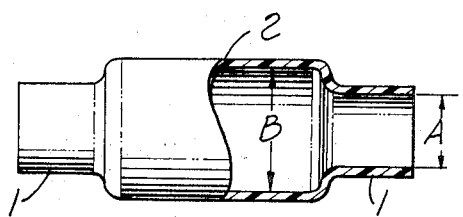

It should be noted that the portions of the tube having diameter A and represented by FIG. 1 are not in a heat recoverable state whereas that portion of the tube having diameter B and shown in FIG. 2 is in a heat recoverable state. Thus, if heat should be applied to section 2, it would recover to the diameter of sections 1 and the tubing would again look like a tubing of FIG. 1. However, if the tubing in FIG. 3 is now crosslinked by adding a crosslink concentration high enough to lock in the stresses caused by the distortion resulting from expansion to diameter B, the heat recoverability of section 2 may be overcome and a new heat recoverable state may be obtained. Thus, if, for example, the tubing shown in FIG. 3 has elastic memory as the result of crosslinking at the dimension shown in FIG. 1 and then is again crosslinked, e.g., by irradiation, at a higher dosage than was used in the initial crosslinking of the tubing in FIG. 1, a new heat recoverable state represented by diameter B can be locked into the tubing shown in FIG. 3. Of course, the heat recoverable dimension of sections 1 will not change because the second crosslinking of those sections also occurs at the original heat recoverable dimension.

It is not necessary to recover sections 1 in order that only section 2, and not sections 1, receives the stress locking treatment. Thus, rather than crosslinking the entire tube shown in FIG. 3, section 2 alone can be crosslinked when the tube is in the condition shown in FIG. 2. To insure that crosslinking irradiation falls only on section 2, shielding may be placed around sections 1. If chemical crosslinking is employed, chemical crosslinking agents can be selectively placed in section 2. Alternately, the entire article may contain chemical crosslinking agents, but only section 2 may be treated with a crosslinking initiator.

Figure 4:
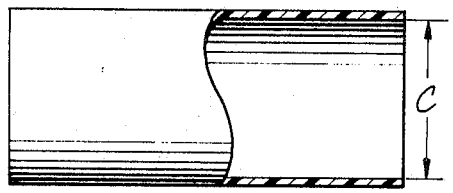
Figure 9:
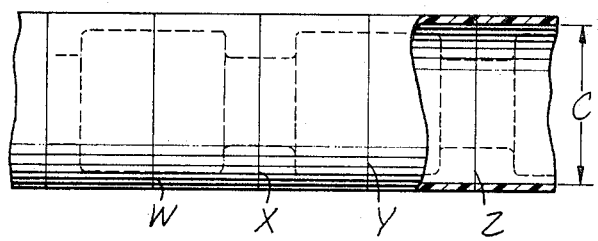
Figure 5:
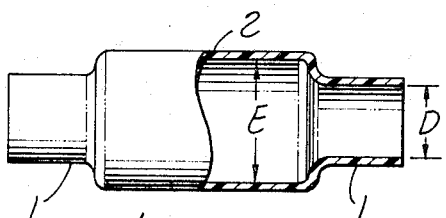

After the tubing in FIG. 3 has been crosslinked with a concentration of crosslinks sufficient to lock in the stresses from the first expansion, it can be again expanded to a third diameter illustrated as C in FIG. 4. Upon heating of the tubing in the expanded state as illustrated in FIG. 4, the end sections 1 will, of course, return to their heat recoverable state having diameter D, which may be the same as A, or an intermediate diameter between A and C. However, section 2, rather than tending to return to its original heat recovery state illustrated by diameter E, which may be the same as B, or an intermediate diameter between B and C. Depending upon the concentration of crosslinks introduced into the material of section 2 during the stress lock crosslinking, the tubing may not be completely converted to a new heat recoverable dimension. Thus, it is possible that the heat recovered diameter of the tubing illustrated in FIG. 5 in section 2 may be a diameter somewhat intermediate between diameter A and diameter B. However, recovery substantially to diameter B can be assured for section 2 by introducing sufficient crosslinking during the second crosslinking step.

Figure 6:
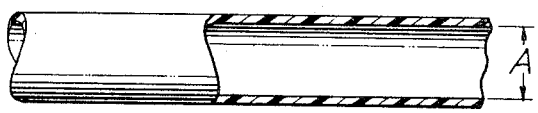
FIGS. 6–9 are illustrative diagrammatic views of a method of continuously forming boots according to the method of this invention.
Figure 7:
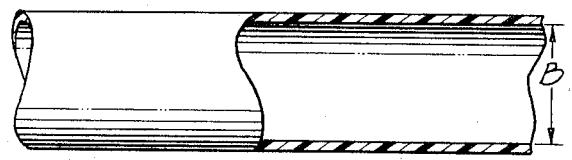
Figure 8:
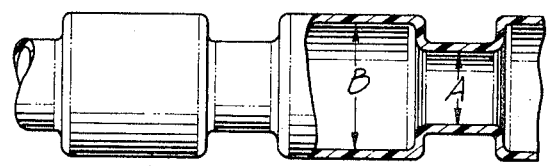

A method of continuously making boots, tubular articles having a base of greater diameter, is illustrated in FIGS. 6–9. A length of heat recoverable tubing as shown in FIG. 6 is expanded from diameter A to diameter B as shown in FIG. 7. The tubing is then caused to heat recover to diameter A as shown in FIG. 8 at alternate positions along the tubing thus forming repeating sections having diameter A and diameter B. The tubing as thus illustrated in FIG. 8 is then crosslinked to lock in the stresses in the expanded portions. The tubing is then expanded to diameter C which is larger than B and cut into sections at $w$, $x$, $y$ and $z$ so that the resulting sections will form boots upon heat recovery as indicated by the dashed lines.

The method of this invention is particularly advantageous in that it does not require expensive molding machinery and procedures. Furthermore, the invention can be used to make articles which do not require any axis of symmetry. Thus, by fixing a portion of the wall of tubing during expansion so that expansion is prevented in one direction, an irregularly shaped article may be obtained.

In general, the method of crosslinking and imparting heat recoverability to the polymeric articles as described in this invention may be performed according to any of the techniques well known in the prior art for imparting heat recoverability by crosslinking of polymers. When irradiation is used to perform the crosslinking for both the initial step and the step of converting to a new heat recoverable form, it is normally necessary to use a higher dosage of irradiation for the second crosslinking step. This higher dosage of irradiation will generally assure that there is a higher concentration of crosslinks introduced during the second step than in the first step. It can be seen that the amount of irradiation is dependent only upon the amount of crosslinking necessary to lock in the stresses in the first distorted state and this in turn is dependent only on the amount of irradiation initially used in the case of irradiated elastic memory material. In general, the amount of irradiation may vary from 1 megarad to 100 megarads.

In addition to irradiation crosslinking, the process of the present invention may be carried out by using chemical crosslinking or a combination of chemical and irradiation crosslinking. In the case of crosslinking with chemicals such as peroxides or azides, it is necessary to first mix the crosslinking agent with the polymer. This may be done by mixing materials in the powder form, by blending the crosslinking agent into the polymer in the molten state, or by diffusing the crosslinking agents, in the gaseous or liquid form, into the solid polymer. The crosslinking agent in the solid polymer will not cause crosslinking until a crosslinking reaction is initiated by some means such as heat, light, etc.

In order to obtain two separate crosslinking reactions by chemical means, it may be necessary to introduce two different crosslinking agents into the polymer, these agents responding to different types of crosslinking initiators. For example, one of the crosslinking initiators might be activated by ultraviolet light. Thus, in order to form the initial heat recoverable state in the polymer, the polymer might be exposed to light causing crosslinking and making the material heat recoverable. On converting this polymer to a new desired shape, the second chemical crosslinking agent, which could be activated by heat, could be initiated by the application of heat to the polymer in its new heat recoverable dimension.

As previously indicated, it may be desirable to cause crosslinking by a combination of chemical crosslinking means and irradiation. Thus, elastic memory could first be imparted to a polymer by chemical crosslinking and the stress locked in by irradiation. On the other hand, just the reverse could be true. Thus, the polymer could be initially filled with a chemical crosslinking agent and formed into an elastic memory material initially by irradiation. Then, the second crosslinking might be obtained by the application of heat to initiate the chemical crosslinking.

The amount of crosslinking necessary to lock in the stresses produced in distoring an article to its heat recoverable state can readily be determined by those skilled in the art. As previously indicated, an irradiation crosslinked elastic memory material will have the distortion stresses locked in by an irradiation dosage which is greater than the initial crosslinking irradiation dosage. In any event, routine testing will readily indicate the required degree of crosslinking.

The heat recoverable material suitable for use in this invention may be any thermoplastic sheet material which has been crosslinked, or which inherently possesses the property of heat recoverability. Examples of such materials are polyolefins such as polyethylene. In addition, various ethylene copolymers may be employed, e.g., copolymers of ethylene and vinyl acetate, ethylene and ethyl acrylate, etc. Other polymers which may be used include polyvinyl halides, e.g., polyvinyl chloride, polyvinylidene halides, e.g., polyvinylidene fluorides; polyacrylates; polyamides, e.g., nylon; polyesters; and other materials such as polyurethanes, ionomers, etc.

The invention can be more fully understood by reference to the following example.

EXAMPLE I

A heat recoverable tube which would recover to an irregularly shaped tube was formed as follows. Sections of clear, low-density polyethylene tubing with dimensions 0.23 inch I.D. and 0.025 inch wall thickness were given 5 megarads of irradiation from a 1 mev. electron source. The irradiated tubing was then expanded over a steel mandrel at 140° C. to an I.D. of 0.60 inch. A 3.5 inch-long section of the tubing was shielded from heat over a length of 1.5 inches at its center by wrapping with a damp cloth and the ends were shrunk by means of an electric heat gun to an I.D. of 0.275 inch, leaving the center portion unchanged at 0.60 inch. The tube, thus shaped, was then irradiated to 15 megarads and re-expanded, as before, to a 1.0 inch I.D. On application of heat from a heat gun, the 1.0 inch diameter tube returned to an equilibrium shape with a center I.D. of 0.53 inch and an end I.D. of 0.30 inch.

The foregoing example is merely illustrative and should not be considered as limting the scope of this invention. The present invention is applicable to both elastic and plastic memory material from all types of polymers and shaped articles obtained from these polymers. Thus, although the invention has been described by reference to a tubular shaped article, it is generally applicable to any shaped polymeric article capable of having the property of elastic memory. These materials may contain filler, antioxidants and other additives. The essence of the invention is that it provides a means for forming articles having different degrees of heat recoverability in different parts of the article and for converting a material from one elastic memory state to another. Thus, the invention is to be limited only by the scope of the appended claims.

We claim:

1. The method of forming a heat recoverable article having different degrees of heat recoverability in different parts of the article which comprises (1) distorting the article to its heat recoverable state by expansion; (2) crosslinking a portion or portions less than the whole of the article in its heat recoverable state with a crosslink concentration high enough to lock in the stresses produced in said portion or portions in distorting said article to said heat recoverable state; and (3) distorting the article to a new heat recoverable state.

2. The method of claim 1 whereinsaid article has the property of plastic memory.

3. The method of claim 1 wherein said article comprises polyvinylchloride.

4. The method of forming a heat recoverable article having different degrees of heat recoverability in different parts of the article which comprises (1) distorting the article to its heat recoverable state by expansion; (2) heat recovering a portion or portions less than the whole of the heat recoverable article; (3) crosslinking at least part of a portion heat recovered in step (2) with a crosslink concentration high enough to lock in stresses produced in said portion in distorting said article to said heat recoverable state; and (4) distorting said article to a new heat recoverable state.

5. The method of claim 4 wherein said article has the property of plastic memory.

6. The method of claim 4 wherein said article comprises polyvinyl chloride.

7. The method of forming a heat recoverable article having different degrees of heat recoverability in different parts of the article by acting upon an article to which the property of elastic memory has been imparted by crosslinking and distortion, which method comprises (1) crosslinking a portion or portions less than the whole of said article having the property of elastic memory with a crosslink concentration higher than the crosslink concentration originally present in said article; and (2) distorting the article to a new heat recoverable state.

8. The method of claim 7 wherein said article is a chemically crosslinked polymer.

9. The method of claim 7 wherein said article is an irradiation crosslinked polymer.

10. The method of claim 7 wherein said article is a tube.

11. The method of claim 7 wherein said article comprises a polyolefin.

12. The method of claim 7 wherein said article comprises polyethylene.

13. The method of forming a tubular article, one portion thereof having a larger diameter than the other portion, comprising crosslinking a tube having substantially uniform diameter, expanding the tube to a second, larger diameter, applying heat to one portion of the tube to cause it to recover to its original diameter while the other portion of the tube remains at the second diameter, introducing crosslinks into the tubular article at a concentration higher than originally introduced, expanding said tube to a dimension at least as large as said second dimension and heat recovering said article.

14. The method of converting to a new memory condition a material to which the property of elastic memory has been imparted by crosslinking and distortion, which method comprises introducing additional crosslinks into a portion or portions less than the whole of said material at a concentration higher than the crosslink concentration originally present in the material.

15. The method of claim 14 wherein said material is thermoplastic polymer.

16. The method of claim 15 wherein the polymer is a polyolefin.

17. The method of claim 15 wherein the polymer is polyethylene.

18. The method of claim 15 wherein said crosslinks are introduced by chemical crosslinking.

19. The method of claim 15 wherein said crosslinks are introduced by irradiation.

20. The method of claim 15 wherein elastic memory was originally imparted to said material by irradiation and said additional crosslinks are obtained by introducing a higher dose of irradiation than in said original irradiation.

21. The method of claim 15 wherein said heat recoverable material is chemically crosslinked thermoplastic material and said crosslinks are introduced by chemical crosslinking.

22. The method of claim 15 wherein said heat recoverable material is chemically crosslinked and said additional crosslinks are introduced by irradiation.

23. The method of claim 15 wherein said heat recoverable material is crosslinked by irradiation and said additional crosslinks are introduced by chemical crosslinking.

24. The method of forming a heat recoverable article having different degrees of heat recoverability in different parts of the article by acting upon an article to which the property of elastic memory has been imparted by crosslinking and distortion, which method comprises (1) heat recovering a portion or portions less than the whole of said article having the property of elastic memory; (2) crosslinking at least part of a portion heat recovered in Step (1) with a crosslink concentration higher than the crosslink concentration originally present in said article; and (3) distorting said article to a new heat recoverable state.

25. The method of claim 24 wherein said article is a chemically crosslinked polymer.

26. The method of claim 24 wherein said article is an irradiation crosslinked polymer.

27. The method of claim 24 wherein said article is a tube.

28. The method of claim 24 wherein said article comprises a polyolefin.

29. The method of claim 24 wherein said article comprises polyethylene.

References Cited

UNITED STATES PATENTS

| 3,303,243 | 2/1967 | Hughes et al. | 264—22 |
| 3,370,112 | 2/1968 | Wray | 264—22 |
| 3,429,954 | 2/1969 | Atkins et al. | 264—22 |

ROBERT F. WHITE, Primary Examiner

R. R. KUCIA, Assistant Examiner

U.S. Cl. X.R.

264—230